US010594247B2

(12) United States Patent
Pruessmeier et al.

(10) Patent No.: US 10,594,247 B2
(45) Date of Patent: Mar. 17, 2020

(54) OUTPUT MODULE OF A DRIVE CONTROL SYSTEM

(71) Applicant: Beckhoff Automation GmbH, Verl (DE)

(72) Inventors: Uwe Pruessmeier, Lemgo (DE); Christian Mische, Bielefeld (DE)

(73) Assignee: Beckhoff Automation GmbH, Verl (DE)

(*) Notice: Subject to any disclaimer, the term of this patent is extended or adjusted under 35 U.S.C. 154(b) by 19 days.

(21) Appl. No.: 15/358,951

(22) Filed: Nov. 22, 2016

(65) Prior Publication Data

US 2017/0149370 A1 May 25, 2017

(30) Foreign Application Priority Data

Nov. 23, 2015 (DE) .................. 10 2015 120 271

(51) Int. Cl.
| | | |
|---|---|---|
| *H02J 5/00* | (2016.01) | |
| *H02M 5/458* | (2006.01) | |
| *H02P 27/08* | (2006.01) | |
| *H02M 7/797* | (2006.01) | |
| *H02P 3/18* | (2006.01) | |
| *H02M 1/12* | (2006.01) | |

(Continued)

(52) U.S. Cl.
CPC .......... *H02P 27/08* (2013.01); *H02M 5/4585* (2013.01); *H02M 7/797* (2013.01); *H02P 3/18* (2013.01); *H02M 1/126* (2013.01); *H02M 1/32* (2013.01); *H02M 1/36* (2013.01)

(58) Field of Classification Search
CPC .......... H02P 27/08; H02P 3/18; H02M 7/797; H02M 5/4585

USPC .......................................................... 318/503
See application file for complete search history.

(56) References Cited

U.S. PATENT DOCUMENTS

| 4,240,015 A | * | 12/1980 | White | ................... | H02P 7/282 |
| | | | | | 318/139 |
| 4,933,620 A | * | 6/1990 | MacMinn | ............... | H02P 6/06 |
| | | | | | 318/685 |

(Continued)

FOREIGN PATENT DOCUMENTS

| DE | 9312845 U1 | 12/1994 |
|---|---|---|
| DE | 19509658 A1 | 9/1996 |
| DE | 29620124 U1 | 2/1997 |
| DE | 102004023314 A1 | 12/2005 |

(Continued)

*Primary Examiner* — Eduardo Colon Santana
*Assistant Examiner* — Zemenay T Truneh
(74) *Attorney, Agent, or Firm* — Dorsey & Whitney LLP

(57) ABSTRACT

An output module for connection to a DC voltage intermediate circuit of a drive control system for an electrical drive comprises a frequency converter which is connected between the DC voltage intermediate circuit and an output of the output module, and a module controller for controlling the frequency converter. The module controller is configured to control the frequency converter in a first operating mode of the output module in such a manner that an electrical motor is driven with an electrical drive current from the DC voltage intermediate circuit via the output. The module controller is configured to control the frequency converter in a second operating mode of the output module in such a manner that an electrical feedback current from the DC voltage intermediate circuit is fed back into an electrical supply network via the output.

22 Claims, 3 Drawing Sheets

(51) Int. Cl.
*H02M 1/32* (2007.01)
*H02M 1/36* (2007.01)

(56) References Cited

U.S. PATENT DOCUMENTS

| | | | |
|---|---|---|---|
| 5,642,270 A | 6/1997 | Green et al. | |
| 2011/0127935 A1* | 6/2011 | Gao | H02M 1/36 318/400.3 |
| 2012/0032617 A1* | 2/2012 | Jones | B63H 21/17 318/51 |
| 2012/0089855 A1* | 4/2012 | Beckhoff | G06F 1/30 713/340 |
| 2013/0093241 A1* | 4/2013 | Lewis | H02M 7/797 307/22 |
| 2014/0001854 A1 | 1/2014 | Motegi | |
| 2015/0098257 A1* | 4/2015 | Wei | H05K 7/1432 363/37 |
| 2015/0365252 A1* | 12/2015 | Bunte | H04L 12/6418 709/208 |

FOREIGN PATENT DOCUMENTS

| | | |
|---|---|---|
| DE | 102006035858 A1 | 10/2007 |
| DE | 112006001604 T5 | 11/2008 |
| DE | 102008034417 A1 | 10/2009 |
| DE | 1020112203204 B3 | 6/2013 |
| EP | 1603224 A1 | 12/2005 |
| EP | 2008860 A2 | 12/2009 |
| EP | 2214302 A2 | 8/2010 |
| EP | 2299581 A2 | 3/2011 |
| EP | 2861047 A2 | 4/2015 |
| WO | 2011151131 A1 | 12/2011 |

* cited by examiner

OUTPUT MODULE OF A DRIVE CONTROL SYSTEM

CROSS-REFERENCE TO RELATED APPLICATION

This application claims priority to German Patent Application DE 10 2015 120 271.9, filed Nov. 23, 2015, entitled AUSGABEMODUL EINES ANTRIEBSSTEUERSYSTEMS, which is incorporated by reference herein, in the entirety and for all purposes.

FIELD

The present invention relates to an output module of a drive control system, to a drive control system, to a network adapter module for an output module of a drive control system, and to a method for operating an output module of a drive control system.

BACKGROUND

Drive control systems for controlling drives having electrical motors often comprise a DC voltage intermediate circuit from which the electrical motors are supplied with an electrical drive current. The drive current is generally an alternating current, for the production of which from the DC voltage of the intermediate circuit output stage modules or axis modules having an output stage configured as an inverter are generally used.

The electrical energy of the DC voltage intermediate circuit is generally provided from an electrical supply network and is buffered in one or more intermediate circuit capacitors connected to the intermediate circuit. The supply network generally carries a multiphase AC voltage and the process of feeding the intermediate circuit comprises rectification of the AC voltage of the supply network by means of a feed module. The intermediate circuit capacitors are generally arranged in the feed module, the output stage module or in both modules. In order to control a plurality of electrical motors, a drive control system may also comprise a plurality of output stage modules in addition to the feed module.

Drive control systems having a DC voltage intermediate circuit may have, on the one hand, a single-component design, with the result that all modules needed to operate the drive control system, in particular the feed module and the output stage module, are arranged in a common housing of the drive control system. Multi-component designs of such drive control systems are also known, in which the required modules are partially or completely arranged in separate housings and are connected to a common DC voltage intermediate circuit. Such a multi-component motor control system is offered by the applicant as the multi-axis servo system of the series AX8000, for example.

In order to brake an electrical motor connected to the drive control system, the motor can be subjected to generator loading by the drive control system. This is generally achieved by suitably controlling the inverter of the output stage. The electrical energy obtained during generator loading is generally initially stored in the DC voltage intermediate circuit, which results in an increase in the intermediate circuit voltage. The energy obtained and stored during generator loading of the electrical motor can also be used, if the supply network fails, to continue to supply the drive control system with electrical energy until the drive has reached a safe state, for instance is at a standstill. This is described, inter alia, in the document DE 195 09 658 A1.

If the intermediate circuit voltage can no longer be increased further and the intermediate circuit therefore can no longer receive any further energy, the excess electrical energy produced must be discharged in another manner. In addition to destroying the energy produced by the generator in the intermediate circuit, for instance in a resistor connected to the intermediate circuit, the electrical energy produced can also be fed back into the supply network. The feedback function is generally provided by the feed module which supplies the intermediate circuit and is connected to the supply network.

SUMMARY

An object of the present invention is to provide improved modules for a drive control system of the type described herein. Another object of the invention is to specify an improved method for operating a drive control system.

These and other objects can be achieved by means of an output module for a drive control system, a drive control system and a method for operating a drive control system.

EXAMPLES

In various examples and embodiments, an output module for connection to a DC voltage intermediate circuit of a drive control system of an electrical drive comprises a frequency converter which is connected between the DC voltage intermediate circuit, also simply referred to as an intermediate circuit below, and an output of the output module, and a module controller for controlling the frequency converter. The module controller is configured in this case to control the frequency converter in a first operating mode of the output module in such a manner that an electrical motor is driven with an electrical drive current from the intermediate circuit via the output. The module controller is also configured to control the frequency converter in a second operating mode of the output module in such a manner that an electrical feedback current from the intermediate circuit is fed back into an electrical supply network via the output.

The features explained here for a frequency converter also analogously apply to a servo amplifier or servo converter.

The output module can therefore be used both as an output stage module or motor control module for driving an electric motor and as a feedback module for feeding energy back into the supply network. In order to provide the motor control function and the feedback function, it is therefore necessary to develop, produce and have available only one module type instead of two different types of modules. In particular, structurally identical output stages can be used for motor control and to provide feedback. Overall, an output module having a motor control and feedback function makes it possible to produce motor control systems in a simple and cost-effective manner.

The second operating mode having the feedback function can be implemented, for example, solely by means of a software change in the output module and therefore without adapting the hardware of conventional output modules for motor control. This makes it possible for end users to equip a motor control system with a feedback function in a simple and cost-effective manner.

The output modules can be produced, for example, in different power classes, for example as versions with differently powerful output stage components such as frequency converters. If such output modules have an operating mode for feedback, the performance of the feedback function can be adapted in a simple manner by suitably selecting the output module.

One development of the output module comprises a current measuring module which is configured to produce a current measurement signal representing the drive current or feedback current flowing via the output. The module controller has a current regulating module which is configured to regulate the drive current flowing via the output in the first operating mode and the feedback current flowing via the output in the second operating mode on the basis of the current measurement signal.

The feedback current can be controlled or regulated solely on the basis of the current measurement signal, for example, and a network-side voltage measurement can be dispensed with in the output module. This allows feedback to be achieved via an output module in a simple and cost-effective manner. Regulation of the feedback solely on the basis of a current measurement signal can be effected, for example, by means of a space vector transformation of the measured current into a rotating, phase-locked coordinate system and the implementation of a virtual resistance characteristic curve in the transformed representation.

In one development of the output module, the module controller is configured to synchronize the feedback current flowing via the output with the electrical supply network in the second operating mode on the basis of the current measurement signal. This makes it possible to easily use the output module in different regions having different electrical supply networks, in particular different network frequencies.

In one development of the output module, the module controller is configured to control a brake of the electrical drive in the first operating mode via a control output of the output module. The module controller is configured to control a switching apparatus in the second operating mode via the control output in order to disconnect the output from the electrical supply network.

By virtue of the fact that both the brake and the switching apparatus are controlled via the control output of the output module, the same hardware of the output module can be used for the first operating mode for motor control and for the second operating mode for feedback. This makes it possible to implement the first operating mode and the second operating mode in the output module in a simple and cost-effective manner, for example purely using software. In particular, no further components are needed to implement the feedback function in comparison with a pure motor control or output stage module.

In one development of the output module, the electrical supply network into which the feedback current is fed back is a three-phase AC network.

In one development of the output module, the module controller is configured to be changed to the first or second operating mode on the basis of a parameterization signal from a superordinate control unit of the drive. This allows the operating modes to be easily activated, for example during initialization of the drive controller by the superordinate control unit.

In one development of the output module, the module controller is configured to be changed to the first or second operating mode on the basis of a parameter received via a parameterization connection of the output module. This allows the second operating mode of the output module to be easily activated by connecting an external device to the parameterization connection. The external device may be, for example, a network adapter module for connecting the output module to the electrical supply network. The output module may also be configured such that the first operating mode is activated if a motor module having an electrical motor is connected to the parameterization connection. In order to activate the first and/or second operating mode, the network adapter module and the motor module may have, for example, an electronic nameplate which can be read by the output module via the parameterization connection.

A drive control system for an electrical drive comprises an output module and a feed module, the feed module being configured to connect the DC voltage intermediate circuit of the drive control system to the supply network and to supply the DC voltage intermediate circuit with electrical energy from the supply network. The output module is configured to feed an electrical feedback current from the DC voltage intermediate circuit back into the supply network in the second operating mode.

Such a drive control system can be operated in an energy-efficient manner by virtue of excess energy which arises in the intermediate circuit being fed back into the supply network. The excess energy can be produced, for example, by an electric motor which is likewise connected to the drive control system and is subjected to generator loading. By virtue of the fact that the output module is used in the second operating mode for feedback, feedback can be achieved in a simple and cost-effective manner by means of an output module which can be used both as a feedback module and as a motor control module.

One development of the drive control system comprises a smoothing apparatus which is connected between the output of the output module and the supply network in order to smooth the electrical feedback current fed back into the supply network via the output module in the second operating mode.

The smoothing apparatus may comprise, for example, one or more coils as storage inductors. Smoothing the feedback current makes it possible to achieve a feedback current flow which is adapted to the AC network and causes only slight loading of the supply network and little harmonic interference. The smoothing of the feedback current can be used to produce a sinusoidal feedback current, for example during pulse-width-modulated control of the inverter.

One development of the drive control system comprises a switching apparatus which is connected between the output of the output module and the supply network in order to disconnect the output of the output module from the supply network.

The switching apparatus can disconnect the output module from the supply network, for example, while the voltage of the intermediate circuit is building up after the drive control system has been switched on. This prevents the phases of the supply network from being short-circuited during charging of the intermediate circuit via parasitic diodes or capacitances of the output stage, as occur at the transistors of the inverter for example, and prevents a harmfully high current flow from occurring. The use of the switching apparatus makes it possible to dispense with a charging circuit which limits the current flow via the output stage of the output module during charging of the intermediate circuit, for example by means of a resistor.

In one development of the drive control system, the switching apparatus is connected to the control output of the output module in order to be controlled.

In one development of the drive control system, the feed module is separate from the output module. The feed module and the output module may be arranged, for example as separate components of the drive control system, in independent housings. In this case, the components of the feed module and of the output module can be connected to a common intermediate circuit which connects the components. For example, connections may be arranged on the modules in such a manner that the modules loop through the intermediate circuit. Intermediate circuit capacitors for maintaining the intermediate circuit voltage may be arranged in the feed module, the output module or in both modules. Alternatively or additionally, capacitor modules which are in the form of separate components and contain intermediate circuit capacitors may also be connected to the intermediate circuit.

The feed module and the output module may each be connected to a superordinate controller of the drive control system via a data network. In this case, the feed module and the output module may each be connected to the data network via a network cable connected to the respective module. However, the modules can also be connected to the data network via a bus system, for example a backplane bus system or a terminal bus system which is looped through the modules and carries the network signals.

One development of the drive control system comprises a further output module, the further output module being configured to supply an electrical motor connected to the output of the further output module with a drive current from the intermediate circuit of the drive control system in the first operating mode.

A drive control system having an output module operated in the second operating mode and a further output module operated in the first operating mode makes it possible to easily and cost-effectively operate a drive control system with a feedback function and therefore in an energy-efficient manner. For example, the output module operated in the second operating mode can be used to feed the energy released during generator loading of the electric motor by the further output module back into the supply network.

A network adapter module for an output module comprises a smoothing apparatus to be connected between the output of the output module and the supply network in order to smooth the electrical feedback current fed back into the supply network via the output module in the second operating mode. The network adapter module also comprises a network adapter control module which can be connected to a parameterization connection of the output module and is configured to transmit a parameter characterizing the network adapter module to the output module.

The output module can use the network adapter control module and the parameterization connection to determine, for example, that its output has been connected to the supply network and is intended to be operated as a feedback module in the second operating mode. The parameter may comprise, for example, a product name of the network adapter module. In the case of a pulse-width-modulated feedback current for example, the smoothing apparatus may cause a feedback current adapted to the alternating current of the supply network, for instance a sinusoidal feedback current, to be output via the network adapter module.

One development of the network adapter module comprises a switching apparatus to be connected between the output of the output module and the supply network in order to disconnect the output of the output module from the supply network, the switching apparatus being able to be controlled via a control output of the output module. The output module can be disconnected from the supply network via the switching apparatus whenever no energy is currently being fed back, for example. This prevents the supply network from being short-circuited via parasitic capacitances or diodes of the output stage of the output module, in particular while the intermediate circuit voltage is building up after the drive control system has been switched on.

In one development of the network adapter module, the network adapter control module is configured to change the module controller to the second operating mode via the parameterization connection.

A method for operating an output module which can be connected to a DC voltage intermediate circuit of a drive control system of an electrical drive comprises checking an operating mode of a module controller of the output module. If a first operating mode is determined, the method also comprises controlling a frequency converter of the output module in order to drive an electrical motor with an electrical drive current from the intermediate circuit via an output of the output module. If a second operating mode is determined, the method also comprises controlling the frequency converter of the output module in order to feed an electrical feedback current from the intermediate circuit back into an electrical supply network via the output.

Such a method can be used to implement both a motor control function and a feedback function in the drive control system in a simple and cost-effective manner using identical output modules.

One development of the method comprises, as a further step in the second operating mode, comparing a voltage of the DC voltage intermediate circuit with an upper cut-off voltage, the frequency converter being controlled to provide feedback if the voltage of the DC voltage intermediate circuit exceeds the upper cut-off voltage. This allows excess energy from the intermediate circuit to be automatically fed back into the supply network as soon as the intermediate circuit voltage exceeds the upper cut-off voltage.

One development of the method comprises, as further steps in the second operating mode, producing a current measurement signal representing an electrical current flowing via the output of the output module, and synchronizing a current regulating module of the output module, which controls the frequency converter, with the supply network on the basis of the current measurement signal. This makes it possible to achieve network-synchronous feedback solely by measuring the feedback current and without an additional voltage measurement by the supply network.

One development of the method comprises, as further steps in the second operating mode, disconnecting the output of the output module from the supply network by means of a switching apparatus connected to the output if the voltage of the DC voltage intermediate circuit falls below a lower cut-off voltage, and connecting the output of the output module to the supply network by means of the switching apparatus before the frequency converter is controlled to provide feedback.

The lower cut-off voltage may correspond, for example, to that voltage of the intermediate circuit upon the undershooting of which feedback from the intermediate circuit in the manner of two-point regulation is terminated. It may also be lower than the voltage mentioned. For example, the lower cut-off voltage may also correspond to a voltage amplitude of an AC voltage of the supply network.

In particular, the output module can be connected to the supply network only when energy from the intermediate circuit is being fed back into the supply network. Disconnecting the output module from the supply network by means of the switching apparatus when no feedback is taking place prevents, in particular, the supply network from being short-circuited via parasitic capacitances or diodes of the output stage or of the frequency converter of the output module in the event of a low intermediate circuit voltage and prevents an uncontrolled current from flowing in the intermediate circuit and via the frequency converter.

BRIEF DESCRIPTION OF THE DRAWINGS

The invention is explained in more detail below using figures, in which in a schematic illustration in each case.

DETAILED DESCRIPTION

Figure 1:
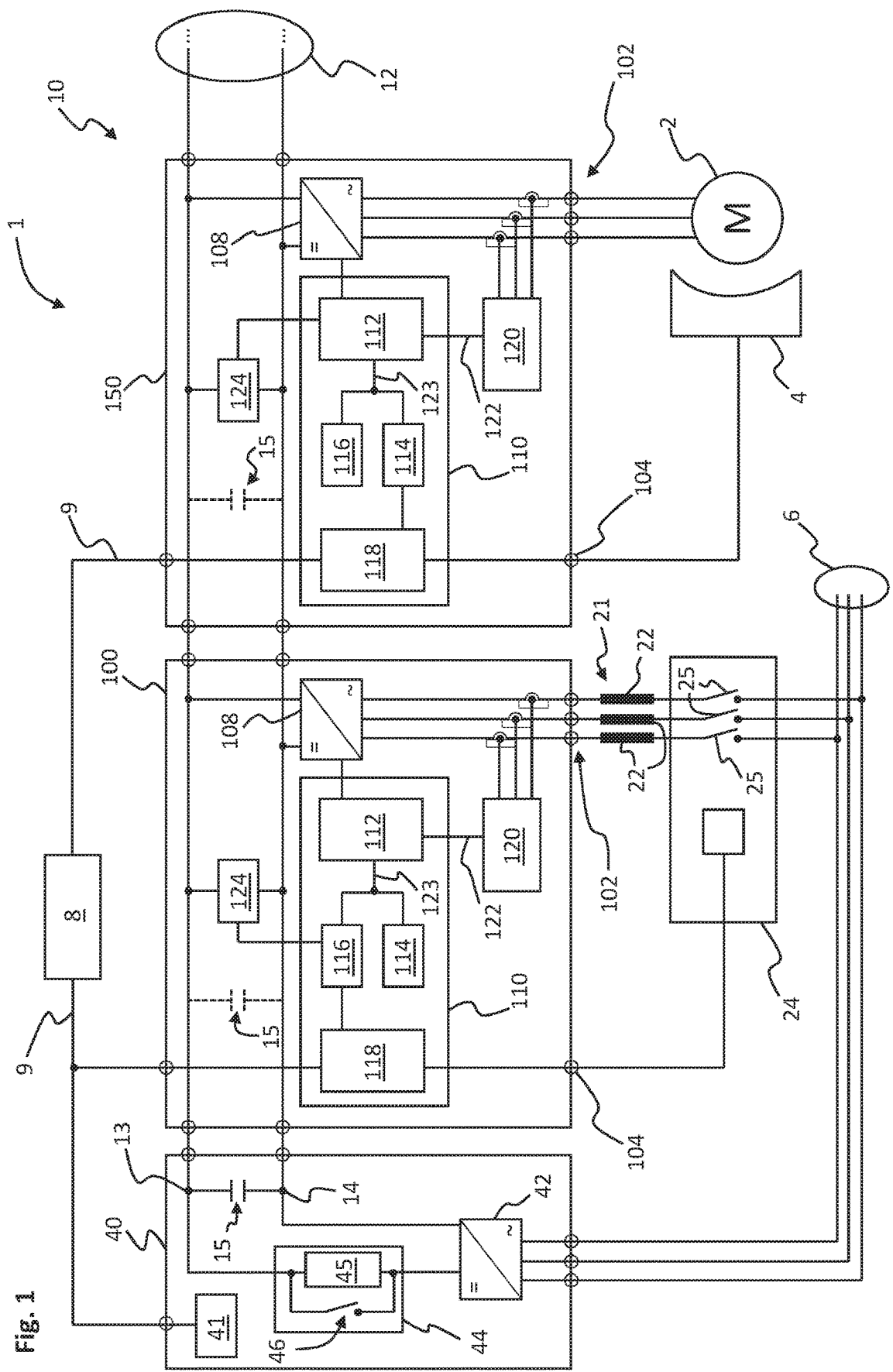
FIG. 1 shows a schematic illustration of a first drive having a first drive control system with a first output module and a first further output module.

FIG. 1 shows a first drive 1 having an electrical motor 2 and a first drive control system 10. The first drive control system 10 is connected to an electrical supply network 6 via a feed module 40 and comprises, in addition to the feed module 40, a first output module 100 and a first further output module 150. The feed module 40, the first output module 100 and the first further output module 150 are connected to a DC voltage intermediate circuit 12 of the first drive control system 10. The DC voltage intermediate circuit 12 is configured to carry an intermediate circuit voltage which is dropped, as a DC voltage, between an upper potential point 13 and a lower potential point 14 of the DC voltage intermediate circuit 12. The intermediate circuit voltage is maintained by an intermediate circuit capacitor 15 which, as illustrated in FIG. 1, can be arranged in the feed module 40.

The first output module 100 and the first further output module 150 have substantially the same structure. The first output module 100 and the first further output module 150 may be the same modules, in particular. The individual elements of the first output module 100 and of the first further output module 150 are therefore marked with the same reference symbols in FIG. 1.

The first output modules 100, 150 are configured to be operated as motor control modules or as feedback modules. For this purpose, the first output modules 100, 150 have a first operating mode and a second operating mode. In the first operating mode, the first output modules 100, 150 act as motor control modules and an output current flowing via an output 102 of the first output modules 100, 150 is supplied, as a drive current, to an electrical motor 2 connected to the output 102. In the first drive control system 10 illustrated in FIG. 1, the first further output module 150 is operated in the first operating mode and the electrical motor 2 is connected to the first further output module 150. If an electrical motor 2 connected to the first output modules 100, 150 is subjected to generator loading, the output current or the drive current can also flow into the first output modules 100, 150.

The electrical motor 2 which can be driven by the first output modules 100, 150 may be an AC motor, for example a multiphase AC motor. In particular, the motor 2, as illustrated in FIG. 1, may be a three-phase AC motor. The motor 2 may be configured, for example, as a synchronous motor or as an asynchronous motor.

In the second operating mode, the first output modules 100, 150 act as feedback modules and the output current flowing via the output 102 of the first output modules 100, 150 is fed, as a feedback current, into a supply network 6 connected to the output 102. In the first drive control system 100 illustrated in FIG. 1, the supply network 6 is connected to the output 102 of the first output module 100 and the first output module 100 is operated in the second operating mode for the purpose of feeding electrical energy from the DC voltage intermediate circuit 12 back into the supply network 6.

The electrical supply network 6 may be, for example, an AC voltage network. In particular, the electrical supply network 6, as illustrated in FIG. 1, may be a three-phase AC voltage network.

The first output modules 100, 150 have a frequency converter 108 which is connected between the DC voltage intermediate circuit 12 of the first output modules 100, 150 and an output 102 of the first output modules 100, 150. The frequency converter 108 is configured to convert the DC voltage of the DC voltage intermediate circuit 12 into an AC voltage or into an alternating current flowing via the output 102 as an output current. For this purpose, the frequency converter 108 is connected, on the DC voltage side, to the DC voltage intermediate circuit 12 and is connected, on the AC voltage side, to the output 102. The relationship between the AC voltage produced by the frequency converter 108 and the alternating current flowing via the output 102 is determined by the impedance of an electrical load connected to the output 102.

The frequency converter 108 may be configured to convert the DC voltage of the intermediate circuit 12 into a multiphase AC voltage or into a multiphase alternating current as the output current. For example, the frequency converter 108 may convert the intermediate circuit voltage, as illustrated in FIG. 1, into a three-phase AC voltage. The frequency converter 108 may be an inverter, for example. The inverter may be in the form of a fully controlled P6 circuit, for example. The half-bridges of the inverter may comprise, for example, power transistors, for instance insulated-gate bipolar transistors (IGBT). The frequency converters 108 form output stages of the first output modules 100, 150 or of the drive control system 10.

In the first drive control system 10, each phase of the supply network 6 configured as a three-phase AC voltage network is respectively connected, via a phase of the output 102, to a phase of the three-phase frequency converter 108 of the first output module 100 operated in the second operating mode. In a similar manner, each phase of the electrical motor 2 configured as a three-phase AC motor is connected, via a respective phase of the output 102, to a respective phase of the three-phase frequency converter 108 of the first further output module 150 operated in the first operating mode.

The first output modules 100, 150 comprise a module controller 110 which is configured to control the frequency converter 108 of the first output modules 100, 150. Controlling the frequency converter 108 makes it possible to control the output current flowing via the output 102 of the first output modules 100, 150, that is to say the drive current for the electrical motor 2 in the first operating mode and the feedback current into the supply network 6 in the second operating mode. For example, output current parameters such as the intensity, the relative phase angle or the direction of the output current can be controlled.

In order to determine the output current parameters of the output current, the first output modules 100, 150 comprise a current measuring module 120. The current measuring module 120 is configured to transmit a current measurement signal 122 representing the output current flowing via the output 102 to the module controller 110, in particular to the current regulating module 112. In the case of a multiphase output current, the current measurement signal 122 may represent the output current in a rotating, phase-locked space vector representation, for example. The current measuring module 120 can record the output current parameters via current transformers arranged between the inverter 108 and the output 102, for example. Alternatively or additionally, the current measuring module 120 can also measure the output current parameters via measuring resistors arranged between the frequency converter 108 and the output 102.

In the first output modules 100, 150, the current measuring module 120 records the output current parameters on each of the three phases of the output 102. In alternative embodiments of the first output modules 100, 150, the current measuring module 120 can also record the output current parameters only on two phases of the output 102 and can calculate the parameters of the third phase from the parameters of the two other phases.

The current measuring module 120 records the output current in the first output modules 100, 150 between the frequency converter 108 and the output 102. Alternatively or additionally, the current measuring module 120 can also record the output current outside the first output modules 100, 150, for example at the supply network 6 or at the electrical motor 2.

In order to control the frequency converter 108, the module controller 110 comprises a current regulating module 112. The current regulating module 112 regulates the output current parameters of the output current flowing via the output 102 of the first output modules 100, 150. In this case, the current regulating module 112, the frequency converter 108 and the current measuring module 120 form a closed control loop which adjusts the drive current flowing via the output 102 to predefined desired current values 123. The control of the frequency converter 108 by the module controller 110, which is required in this case, can be effected in a pulse-width-modulated manner, for example.

If the first output modules 100, 150 are operated in the first operating mode for motor control, as is the case for the first further output module 150 in FIG. 1, the first output modules 100, 150 control the drive current output via the output 102 for the electrical motor 2 on the basis of the current measurement signal 122. The desired current values 123 required for this purpose can be produced by a rotational speed regulating module 114 of the module controller 110 and can be supplied to the current regulating module 112. The rotational speed regulating module 114 is in turn configured to regulate the rotational speed of the electrical motor 2 to a predefined desired rotational speed. The rotational speed of the electrical motor 2 can be recorded, for example, by a measuring transducer (not illustrated here) arranged on the electrical motor 2 and can be transmitted to the rotational speed regulating module 114.

The module controller 110 of the first further output module 150 can also control the inverter 108 in such a manner that the electrical motor 2 is subjected to generator loading and electrical energy from the motor windings of the motor 2 is fed back into the DC voltage intermediate circuit 12. This generally results in an increase in the intermediate circuit voltage if the energy which has been fed back is stored in the intermediate circuit capacitor 15.

In alternative embodiments of the first output modules 100, 150, the module controller 110 can also be configured to produce the desired current value 123 in the first operating mode on the basis of position regulation of the electrical motor 2 or on the basis of speed regulation of the electrical motor 2. In these cases, the module controller 110 may have, as an alternative or in addition to the rotational speed regulating module 114, a position regulating module which is not illustrated here or a speed regulating module which is likewise not illustrated here.

The first output modules 100, 150 have a voltage measuring module 124 which measures the intermediate circuit voltage dropped between the upper potential point 13 and the lower potential point 14 of the DC voltage intermediate circuit 12. In the first further output module 150 which is operated in the first operating mode, the voltage measuring module 124 transmits a voltage measurement signal representing the intermediate circuit voltage to the current regulating module 112. The current regulating module 112 can use the voltage measurement signal to detect a voltage drop in the DC voltage intermediate circuit 12, for example.

In order to avoid the rotational speed of the electrical motor 2 likewise falling in the event of a voltage drop in the DC voltage intermediate circuit 12, the current regulating module 112 can adapt the control of the frequency converter 108 to the changed intermediate circuit voltage as soon as it receives a voltage measurement signal which signals the voltage drop. As a result, the current regulating module 112 can react more quickly to voltage fluctuations in the DC voltage intermediate circuit 12 than would be the case if the current regulating module 112 were to react only to a variation in the output current caused by the drop in the intermediate circuit voltage and measured by the current measuring module 120. The reaction of the current regulating module 112 to a drop in the intermediate circuit voltage can be achieved, for example, by means of model-based predictive regulation which takes into account, inter alia, the inductive and resistive load of the electrical motor 2.

The module controller 110 of the first output modules 100, 150 comprises a first processing module 118 which is connected to a superordinate control unit 8 of the electrical drive 1. The connection to the superordinate control unit 8 is achieved via a data network 9. The data network 9 may be, for example, a wired data network or a radio-based data network. In particular, the data network 9 may be a field bus system, for instance an EtherCAT field bus system.

The superordinate control unit 8 is configured to control the drive control system 10 and the drives connected to the drive control system 10, for example the electrical motor 2. The control can be effected, for example, on the basis of state data which relate to an industrial installation comprising the first drive 1 and are reported back to the superordinate control unit 8. The superordinate control unit 8 may be, for example, a programmable logic controller (PLC) or an industrial PC having a control program which controls the first drive 1 and the industrial installation comprising the first drive 1.

In the first operating mode of the first output modules 100, 150, the first processing module 118 receives, inter alia, the rotational speed desired values for the rotational speed regulation from the superordinate control unit 8 via the data network 9 and transmits the rotational speed desired values to the rotational speed regulating module 114.

If the first output modules 100, 150 are operated in the second operating mode to provide feedback into the supply network 6, as is the case for the first output module 100 in the first drive control system 10, the first output modules 100, 150 control the feedback current fed back into the supply network 6 via the output 102 on the basis of the current measurement signal 122 representing the current flow measured by the current measuring module 120 between the frequency converter 108 and the output 102.

In the first output module 100 operated in the second operating mode, the module controller 110 uses the value of the intermediate circuit voltage of the DC voltage intermediate circuit 12, as determined by the voltage measuring module 124, to control the feedback from the DC voltage intermediate circuit 12 into the supply network 6. In this case, the module controller 110 can compare the voltage of the DC voltage intermediate circuit 12 with an upper cut-off voltage, for example, the upper cut-off voltage indicating a maximum permissible voltage or a determinable maximum permissible voltage of the DC voltage intermediate circuit 12. If the upper cut-off voltage is exceeded by the intermediate circuit voltage, the module controller 110 can start to feed energy from the DC voltage intermediate circuit 12 back into the supply network 6 in the second operating mode of the output modules 100, 150. In the manner of two-point regulation, the module controller 110 can feed back energy from the DC voltage intermediate circuit 12, for example, until the voltage of the DC voltage intermediate circuit 12 has fallen below the upper cut-off voltage again by a fixed differential voltage.

In the second operating mode of the output modules 100, 150, the desired current value 123 to be adjusted for the output current flowing via the output 102 is predefined to the current regulating module 112 of the module controller 110 by a feedback regulating module 116, rather than by the rotational speed regulating module 114, unlike in the first operating mode of the first output modules 100, 150. In the second operating mode, the feedback regulating module 116 of the module controller 110 receives the voltage measurement signal representing the voltage of the DC voltage intermediate circuit 12 from the voltage measuring module 124. The feedback regulating module 116 compares the intermediate circuit voltage measured by the voltage measuring module 124 with the upper cut-off voltage. If the intermediate circuit voltage exceeds the upper cut-off voltage, the feedback regulating module 116 transmits the desired current value 123 to be set by the current regulating module 112 as the feedback current to the current regulating module 112.

In the first output module 100 operated in the second operating mode of the first output modules 100, 150, the module controller 110 can regulate the feedback current fed back into the supply network 6 according to a characteristic curve which indicates the ratio of the intermediate circuit voltage to the feedback current to be set. For example, the feedback current to be output may be proportional to the intermediate circuit voltage, with the result that the characteristic curve can be represented by a resistance value. The feedback regulating module 116 and the current regulating module 112 can then set the feedback current according to this virtual resistance value on the basis of the intermediate circuit voltage.

When regulating the feedback current, the module controller 110 of the first output module 100 can also control a current rise rate of the feedback current, for example can limit it to a maximum value. This makes it possible to achieve a current ramp, in the case of which only a small feedback current initially flows at the start of the feedback and the intensity of the feedback current rises with increasing duration of the feedback. This avoids instantaneous loading of the output stage or of the frequency converter 108 of the first output module 100 when feedback begins. The current rise rate or the feedback current ramp can be achieved, for example, by means of a predefined temporal variation in the virtual resistance of the feedback characteristic curve.

The upper cut-off voltage, the characteristic curve or the current rise rate can be stored in the module controller 110, for example in the feedback regulating module 116 or the current regulating module 112. The upper cut-off voltage, the characteristic curve or the current rise rate can also be stored, however, in the first processing module 118 of the module controller 110 or can be predefined by the first processing module 118. For example, the first processing module 118 can receive the upper cut-off voltage, the characteristic curve or the current rise rate from the superordinate control unit 8 of the first drive 1 via the data network 9. This can be carried out, for example, during initialization of the first drive control system 10 by the superordinate control unit 8 after the first drive 1 has been switched on. During operation of the first drive 1, the superordinate control unit 8 can also change parameters such as the upper cut-off voltage, the characteristic curve or the current rise rate which characterize the feedback.

The module controller 110 may be configured to synchronize the feedback current flowing via the output 102 with the electrical supply network 6 in the second operating mode of the first output modules 100, 150 on the basis of the current measurement signal produced by the current measuring module 120. In the case of synchronized feedback, the three-phase AC voltage produced by the frequency converter 108 and the AC voltage dropped in the supply network 6 have a phase offset such that a feedback current which is substantially uniform flows from the frequency converter 108 in the direction of the supply network 6. In the case of a three-phase sinusoidal AC voltage in the supply network 6, synchronized feedback can be achieved by virtue of the frequency converter 108 producing an AC voltage which is likewise sinusoidal and has a predefined or temporally constant phase offset with respect to the AC voltage in the supply network 6.

The feedback can be synchronized with the supply network 6 in the first output module 100 operated in the second operating mode without a voltage measurement on the network side which measures the voltage in the phases of the supply network 6. When feedback begins, the module controller 110 can control the frequency converter 108 with a stipulated or random phase angle which is initially independent of the phase angle of the AC voltage in the supply network 6. If the frequency converter 108 and the supply network 6 are not synchronized with one another, a high feedback current temporarily flows via the output 102. This feedback current is reported back to the module controller 110 by the current measuring module 120 and the module controller 110 varies the phase angle of the frequency converter 108 until substantially a constant and limited current flow via the output 102 is established.

With the current regulating module 112, the current measuring module 120 and the voltage measuring module 124, the first output modules 100, 150 have a fast current regulating circuit for controlling the output current flowing via the output 102. For example, the module controller 110, in particular the current regulating module 112, and/or the current measuring module 120 and/or the voltage measuring module 124 can be in the form of integrated circuits. For example, the module controller 110 and/or the current measuring module 120 and/or the voltage measuring module 124 may be in the form of field programmable gate array (FPGA) circuits.

The first output modules 100, 150 have a control output 104 which is connected to the module controller 110. For example, the control output 104 can be connected to the first processing module 118. In the first operating mode, the first output modules 100, 150 can control a brake 4 of the electrical motor 2 via the control output 104. In the first drive control system 10, a brake 4 of the electrical motor 2 is therefore connected to the control output 104 of the first further output module 150. The brake 4 may be an electromechanical holding brake, for example. The brake 4 can be used to hold, for example fix, the electrical motor 2 in a secured state. Alternatively or additionally, the electrical motor 2 may be braked by means of the brake 4 during emergency braking if the drive current fails.

The first processing module 118 can control the brake 4, for example, on the basis of control data received by the first processing module 118 from the superordinate control unit 8 of the first drive 1 via the data network 9. Alternatively or additionally, the first processing module 118 can control the brake 4 on the basis of data present or produced in the first further output module 150.

In the first drive 1, the output 102 of the first output module 100 operated in the second operating mode is connected to the supply network 6 via a smoothing apparatus 21 and a switching apparatus 24, the smoothing apparatus 21 and the switching apparatus 24 being connected in series. The smoothing apparatus 21 is configured to smooth the feedback current fed back from the intermediate circuit 12 into the supply network 6 via the first output module 100. This makes it possible to produce a smoothed and, for example, substantially sinusoidal feedback current, for example in the case of pulse-width-modulated regulation of the feedback current, for instance by means of pulse-width-modulated control of the frequency converter 108.

The smoothing apparatus 21 may comprise coil components as storage inductors 22, for example. In this case, as illustrated in FIG. 1, one of the storage inductors 22 may be respectively arranged in each individual phase of the phases of the output 102. The smoothing apparatus 21 illustrated in FIG. 1 comprises three storage inductors 22 which are each connected to one of the three phases of the output 102 of the first output module 100.

The switching apparatus 24 is configured to disconnect the output 102 of the first output module 100 from the supply network 6. For this purpose, the switching apparatus 24 has switches 25 which are connected between the output 102 and the supply network 6. The switching apparatus 24 has a total of three switches 25, one for each of the three phases of the output 102. The switching apparatus 24 may be one or more contactors, for example.

The performance of the switching apparatus 24 and the performance of the smoothing apparatus 21 are adapted to the power class of the output stage or of the frequency converter 108 of the first output module 100. The switching apparatus 24 and the smoothing apparatus 21 may be, for example, standard components which are provided by a user of the drive 1 and are connected to the first drive control system 10 and are in the form of components separate from the first output module 100.

Unlike in the case of the first further output module 150 operated in the first operating mode, in the case of the first output module 100 operated in the second operating mode, the switching apparatus 24, instead of the brake 4, is connected to the control output 104 of the first output module 100 in order to be controlled. As a result, the switching apparatus 24 can be controlled by the module controller 110, in particular by the first processing module 118, of the first output module 100 and the switches 25 can be opened or closed by the control module 110.

By virtue of the fact that the module controller 110 disconnects the first output module 100 from the supply network 6 by means of the switching apparatus 24, it is possible to prevent the supply network 6 from being short-circuited via parasitic capacitances or diodes of the frequency converter 108 in the event of a low intermediate circuit voltage in the DC voltage circuit 12. For this purpose, the first output module 100 can be disconnected from the supply network 6 by means of the switching apparatus 24, in particular, as long as the voltage of the DC voltage intermediate circuit 12 has not yet reached an operating voltage after the first drive 1 has been switched on.

The module controller 110 may be configured, for example, to connect the first output module 100 to the electrical supply network 6 by closing the switching apparatus 24 only when the voltage of the DC voltage intermediate circuit 12 exceeds the upper cut-off voltage and a feedback current is fed back into the supply network 6. When the feedback is controlled in the manner of two-point regulation, the module controller 110 can disconnect the first output module 100 from the supply network 6 again as soon as the DC voltage of the DC voltage intermediate circuit 12 has fallen below a lower cut-off voltage.

The lower cut-off voltage may correspond, for example, to that voltage in the DC voltage intermediate circuit 12 for which the feedback into the supply network 6 is terminated again. In such a case, the first output module 100 would be connected to the supply network via the switching apparatus 24 only when the feedback function is active. This minimizes power losses in the frequency converter 108 when feedback is inactive.

Alternatively, the lower cut-off voltage may also be such that the module controller 110 also disconnects the first output module 100 from the supply network 6 by means of the switching apparatus 24 only when the voltage of the DC voltage intermediate circuit 12 is below a lower limit value at which the risk exists of the supply network 6 being short-circuited via the frequency converter 108. The lower limit value may be lower than the operating voltage of the DC voltage intermediate circuit 12, for example. The lower limit value may correspond, for example, to the voltage amplitude of the AC voltage of the supply network 60 or may be lower than this voltage amplitude.

The first output modules 100, 150 may be configured to transmit operating data relating to the first output modules 100, 150 to the superordinate control unit 8. In the first further output module 150 operated in the first operating mode, the operating data may be, for example, the instantaneous output current, the electrical power output from the DC voltage intermediate circuit 12, the degree of utilization of the output stage or of the frequency converter 108 of the first output modules 100, 150, the intermediate circuit voltage measured by the voltage measuring module 124 or a status of the first output modules 100, 150.

In the first output module 100 operated in the second operating mode, the status can provide information relating to whether or not a feedback current is output, the first output module 100 is ready to provide feedback or there is a fault in the first output module 100, for example. The operating data reported back by the first output module 100 can also comprise a network voltage of the supply network 6, as determined from the intermediate circuit voltage and the feedback current.

The operating mode of the output modules 100, 150 is respectively stipulated in the first drive 1 via a parameterization signal which is transmitted from the superordinate control unit 8 to the module controllers 110 of the first output modules 100, 150 via the data network 9. The parameterization signal therefore stipulates that the first output module 100 is operated as a feedback module in the second operating mode and that the first further output module 150 is operated as a motor control module in the first operating mode. In addition, the first output modules 100, 150 can transmit parameters required in the first or second operating mode from the superordinate control unit 8 via the data network 9. In addition, the first output modules 100, 150 can be switched on or off by the superordinate control unit 8 via the data network 9.

The parameters required for the first operating mode may be, for example, the desired rotational speed, the desired position or the desired speed of the motor 2. The parameters required for the second operating mode may be, for example, the upper cut-off voltage, the differential voltage, the lower cut-off voltage, the virtual resistance, its characteristic curve or the limit value for the current rise rate of the feedback current. The parameters may also be partially or completely stored in the first output modules 100, 150. In this case, the stored parameters may be overwritten during operation by the superordinate control unit 8, for example.

Alternatively, the operating mode of the first output modules 100, 150 may also be stored in the first output modules 100, 150, for example in the module controllers 110, in particular in the first processing modules 118. The operating mode stored in the module controllers 110 may be stipulated by the user of the first drive control system 10, for example by means of a switch arranged on the first output modules 100, 150. Alternatively, the first output modules 100, 150 may also store a standard operating mode which can be overwritten or changed by the superordinate control unit 8 via the data network 9. The operating modes can be set by the superordinate control unit 8 by means of the parameterization signal, for example after the first drive 1 has been switched on, during parameterization of the first drive control system 10.

The intermediate circuit voltage of the DC voltage intermediate circuit 12 is provided by the feed module 40 and is maintained by means of one or more intermediate circuit capacitors 15. The intermediate circuit capacitors 15 are arranged between the upper potential point 13 and the lower potential point 14 of the DC voltage intermediate circuit 12. An intermediate circuit capacitor 15 is arranged in the feed module 40 in the first drive control system 10. Alternatively or additionally, the intermediate circuit capacitor 15 can also be respectively arranged in the first further output modules 100, 150. One or more intermediate circuit capacitors 15 can also be arranged in a separate capacitor module connected to the DC voltage intermediate circuit 12. In the case of a multi-component drive control system 10, the capacitor module can be realized in a separate housing, for example.

The feed module 40 is connected to an electrical supply network 6. In order to produce the intermediate circuit voltage, the feed module 40 comprises a rectifier 42 which is connected between the supply network 6 and the DC voltage intermediate circuit 12. The rectifier 42 may be a fully controlled bridge rectifier, for example.

The feed module 40 also comprises a charging circuit 44 which is connected between the rectifier 42 and the upper potential point 13 of the DC voltage intermediate circuit 12. In alternative embodiments of the feed module 40, the charging circuit 44 may also be connected between the rectifier 42 and the lower potential point 14 of the DC voltage intermediate circuit 12.

The charging circuit 44 is configured to limit a current flow into the DC voltage intermediate circuit 12 after the first drive control system 10 has been switched on as long as the DC voltage intermediate circuit 12 has not yet reached its operating voltage. In order to limit the charging current of the DC voltage intermediate circuit 12, the charging circuit 44 comprises a resistor 45 connected between the rectifier 42 and the DC voltage intermediate circuit 12. The resistor 45 can be bridged by means of a switch 46 connected in parallel with the resistor 45. This can be carried out, for example, as soon as the voltage of the DC voltage intermediate circuit 12 has risen to the operating voltage after the first drive control system 10 has been switched on.

The feed module 40 comprises a feed module controller 41 which is connected to the superordinate control unit 8 of the first drive 1 via the data network 9. The feed module controller 41 can receive data signals, for example, from the superordinate control unit 8 via the data network 9, which data signals are used to switch on the feed module 40, to stipulate the operating voltage of the DC voltage intermediate circuit 12 or to predefine a maximum value and/or a minimum value for the intermediate circuit voltage. The feed module controller 41 can transmit data signals to the superordinate control unit 8 via the data network 9, which data signals represent, inter alia, the instantaneous intermediate circuit voltage or the switching state of the switch 46 or the power fed into the DC voltage intermediate circuit 12.

In addition to the first output module 100 and the first further output module 150, the first drive control system 10 may have further output modules which are likewise connected to the DC voltage intermediate circuit 12 and are configured like the first output modules 100, 150. The output modules connected to the DC voltage intermediate circuit 12 can therefore control a plurality of electric motors, for example, for instance in order to implement a multi-axis drive system or to achieve parallel feedback via a plurality of output modules. The first output modules 100, 150 may also be referred to as axis modules of the drive control system 10.

The first output modules 100, 150 and the feed module 40 may be in the form of independent components or subassemblies of the first drive control system 10 in respective separate housings. A connection to the DC voltage intermediate circuit 12 can be effected, for example, via a current-carrying connection system which connects the housings, for instance a plug connection system. Modules can also be connected via single wires or multi-wire lines. Alternatively or additionally, two or more output modules which are configured like the first output modules 100, 150 may also be integrated in one physical housing. In this case, the integrated modules may have independent module controllers 110 and independent frequency converters 108. A housing having a plurality of first output modules 100, 150 may also have a heat sink which is common to the output modules, a common intermediate circuit capacitor 15 or a common first processing module 118 for connection to the data network 9 and to the superordinate control unit 8.

Alternatively, all or some of the modules 40, 100, 150 of the first drive control system 10 and/or the superordinate control unit 8 may also be arranged in a common housing. The data network 9 may be configured as a backplane bus in the case of such a design, in particular.

In the sense of a "load-balancing" function, the motor control and feedback functions may be divided among the output modules in such a manner that, during normal operation, the energy loading of the frequency converters 108 is distributed as favourably as possible across all first output modules 100, 150. For example, in the case of a multi-component structure, two output modules in different housings may be used to subject the motor 2 to generator loading and to simultaneously feed the electrical current generated in the process back into the supply network 6.

Alternatively, first output modules 100, 150 which are arranged together in a housing can also be used to subject the motor 2 to generator loading and to feed back the energy obtained. In this case, the loading of the intermediate circuit capacitors 15 can be restricted to the intermediate circuit capacitor 15 in the relevant housing and the feedback current must not flow via module connections between individual module housings in the DC voltage intermediate circuit 12.

Figure 2:
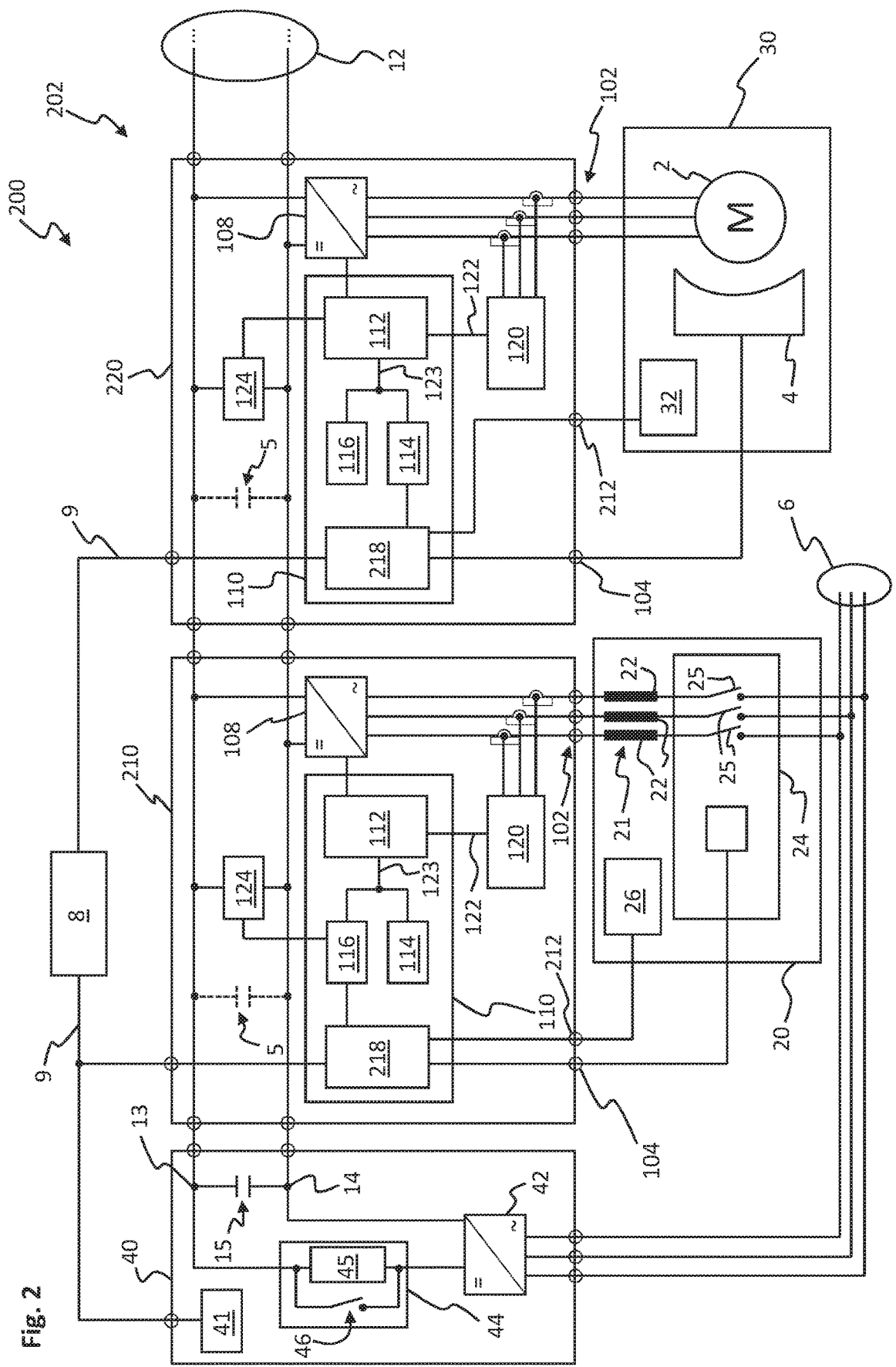
FIG. 2 shows a schematic illustration of a second drive having a second drive control system with a second output module, a second further output module and a network adapter module.

FIG. 2 shows a schematic illustration of a second drive 200 having a second drive control system 202. If no differences are described below, the second drive 200 and the second drive control system 202 are configured like the first drive 1 and the first drive control system 10. In particular, the second drive control system 202 comprises the DC voltage intermediate circuit 12 and the feed module 40 connected between the DC voltage intermediate circuit 12 and the supply network 6.

Instead of the first output modules 100, 150, the second drive control system 202 comprises a second output module 210 and a second further output module 220. If no differences are described below, the second output modules 210, 220 are configured like the first output modules 100, 150. Like the first output module 100, the second output module 210 is used as a feedback module in the second operating mode of the output modules 100, 150, 210, 220 in order to feed electrical energy from the DC voltage intermediate circuit 12 back into the supply network 6 connected to the output 102 of the second output module 210. Like the first further output module 150, the second further output module 220 is operated in the first operating mode of the output modules 100, 150, 210, 220 in order to supply the electrical motor 2 of the second drive 200, which is connected to the output 102 of the second further output module 220, with drive current from the DC voltage intermediate circuit 12.

Unlike the first output modules 100, 150, the second output modules 210, 220 have a parameterization connection 212 in addition to the output 102 and the control output 104. The second output modules 210, 220 are configured to be changed to the first or second operating mode via a parameter received via the parameterization connection 212.

Unlike in the first drive 1, the electrical motor 2 and its brake 4, which is controlled by the second further output module 220 via its control output 104, are arranged in a motor module 30 of the second drive 200. The smoothing apparatus 21 and the switching apparatus 24 are also arranged in the second drive 200 in a manner connected in series in a network adapter module 20.

The motor module 30 and/or the network adapter module 20 may be independent components of the second drive 200 which are arranged in housings which are separate from the remaining components, in particular the second output modules 210, 220. Apart from the arrangement in the motor module 30 and the network adapter module 20, the control of the brake 4 and of the switching apparatus 24 via the control output 104, the control of the motor 2 and the feedback into the supply network 6 are carried out in the second drive 200 in the manner described in connection with the first drive 1.

The measurement of the output current by the current measuring module 120, which is needed to control the frequency converter 108 in a regulated manner, can also be carried out in the second drive control system 202 in the motor module 30 and/or in the network adapter module 20 instead of between the frequency converter 108 and the output 102. For example, sensor lines of the current measuring module 120 can be routed to the motor module 30 or to the network adapter module 20 or the current measuring module 120 may be arranged in the motor module 30 or in the network adapter module 20.

In addition to the brake 4 and the electrical motor 2, the motor module 30 comprises a motor module control unit 32. The motor module control unit 32 may be an electronic circuit having a processing unit, a communication unit and a memory. For example, the motor module control unit 32 may be configured as an integrated circuit.

The motor module control unit 32 is connected to the module controller 110 of the second further output module 220 via the parameterization connection 212 of the second further output module 220. For example, the motor module control unit 32 may be connected to a second processing module 218 of the module controller 110 of the second further output module 220 via the parameterization connection 212.

If no differences are described below, the second processing module 218 of the module controllers 110 of the second output modules 210, 220 is configured like the first processing module 118 of the module controllers 110 of the first output modules 100, 150. The module controller 110 of the second further output module 220 can be changed to the first operating mode for controlling the electrical motor 2 by means of the motor module control unit 32 connected to the parameterization connection 212. For this purpose, the module controller 110 of the second further output module 220 can receive a parameter via the parameterization connection 212. The parameter received by the module controller 110 indicates that a module configured as the motor module 30 is connected to the output 102 of the second further output module 220. The parameter may be, for example, the product name of the electrical motor 2 or of the motor module 30.

Characteristic data relating to the motor module 30, in particular the electrical motor 2, can be transmitted to the module controller 110 of the second further output module 220 via the parameterization connection 212. The characteristic data may be, for example, a nominal power, a peak power, a nominal current or a peak current of the electrical motor 2. Alternatively or additionally, the characteristic data may also be the resistance or the inductance of the coils of the electrical motor 2. Alternatively or additionally, the module controller 110 of the second further output module 220 may store data in the motor module control unit 32, for example an identifier, for instance a product name or a serial number, of the second further output module 220 or the operating hours already completed by the motor module 30. The motor module controller 32 can therefore provide, inter alia, the function of an electronic nameplate of the electrical motor 2 or of the motor module 30.

During initialization of the second drive control system 202, for example after the second drive 200 has been switched on, the parameters and characteristic data stored in the motor module control unit 32 of the motor module 30 can be read and processed by the module controller 110 of the second further output module 220. Storage of parameters or characteristic data in the motor module control unit 32 of the motor module 30 by the module controller 110 can be protected by means of a password, for example. As a result of the password, the parameters or characteristic data stored in the motor module control unit 32 are protected against unauthorized reading or against unauthorized amendment.

Like the first output module 100 of the first drive control system 10, the second output module 210 of the second drive control system 202 is operated in the second operating mode of the output modules 100, 150, 210, 220 in order to feed electrical energy from the DC voltage intermediate circuit 12 back into the supply network 6. Like in the first drive control system 10, the smoothing apparatus 21 and the switching apparatus 24 of the network adapter module 20 are connected between the output 102 of the second output module 210 and the supply network 6.

The network adapter module 20 has a network adapter control unit 26. The network adapter control unit 26 has a similar configuration to the motor module control unit 32. In particular, the network adapter control unit 26 may be an electronic circuit having a communication device, a processing device and a memory. The network adapter control unit 26 is connected to the parameterization connection 212 of the second output module 210 and therefore communicates with the module controller 110 of the second output module 210. In particular, the network adapter control unit 26 can communicate with the second processing module 218 of the module controller 110 of the second output module 210 via the parameterization connection 212.

The network adapter control unit 26 stores parameters which characterize the network adapter module 20, in particular the smoothing apparatus 21 and the switching apparatus 24 of the network adapter module 20, and can provide the functionality of an electronic nameplate. The parameters may comprise a product name of the network adapter module 20, an inductance or a resistance of the storage inductors 22 of the smoothing apparatus 21, a nominal current, a peak current, a nominal power or a peak power of the feedback current which can be passed through the network adapter module 20. Alternatively or additionally, the network adapter control unit 26 may store a short-circuit voltage, a nominal or rated voltage or a pulse voltage of the storage inductors 22 or of the switching apparatus 24. A time constant predefined by the inductance of the storage inductors 22, a tolerance range of the inductance of the storage inductors 22 and a rated frequency of the network adapter module 20 can also be stored as parameters. If the storage inductors 22 are coils with an iron core, characteristic data relating to the iron core can also be stored as parameters in the network adapter control unit 26.

The module controller 110 of the second output module 210 is configured to be changed to the second operating mode via one of the parameters which are stored in the network adapter module 20 and are transmitted via the parameterization connection 212. This parameter may be, for example, the product name of the network adapter module 20. The parameters stored in the network adapter control unit 26 may be transmitted to the module controller 110, for example, during initialization of the second output module 210 after the second drive control system 202 has been switched on.

During operation of the second drive control system 202, operating data can be interchanged between the module controller 110 of the second output module 210 and the network adapter control unit 26 of the network adapter module 20. Such data interchange can be carried out cyclically, for example. The operating data may be, for example, the switching state of the switching apparatus 24 or the temperature of the smoothing apparatus 21 or of other components of the network adapter module 20. The operating data may also comprise a status of the network adapter module 20 which indicates whether the network adapter module 20 is ready to transmit a feedback current or whether there is a fault in the network adapter module 20.

Like in the motor module control unit 32 of the motor module 30, the parameters stored in the network adapter control unit 26 of the network adapter module 20 can be changed by the second output module 210 or further parameters can be stored in the network adapter control unit 26 by the second output module 210. The further parameters may be the operating hours already completed by the network adapter module 20.

The second output module 210 may also store its own module identifier in the network adapter control unit 26 of the network adapter module 20. This storage can be carried out, for example, when the network adapter module 20 is first connected to the parameterization connection 212 of the second output module 210. Like in the second further output module 220 and the motor module 30, the parameters stored in the network adapter control unit 26 of the network adapter module 20 may be password-protected. The superordinate control unit 8 can also access the network adapter control unit 26 or the motor module control unit 32, in particular the parameters stored in the control units 26, 32, via the second output modules 210, 220, more precisely via their module controllers 110 and the parameterization inputs 212, and can change these parameters.

The second output modules 210, 220 may also be configured to monitor the electrical power output via the outputs 102 and to determine and log total loading of the motor 2 or of the network adapter module 20 using the characteristic data relating to the electrical motor 2 or the network adapter module 20. The previous loading of the motor 2 or of the network adapter module 20 can be stored in the control units 26, 32 of the motor module 30 or of the network adapter module 20, for example for service purposes.

Figure 3:
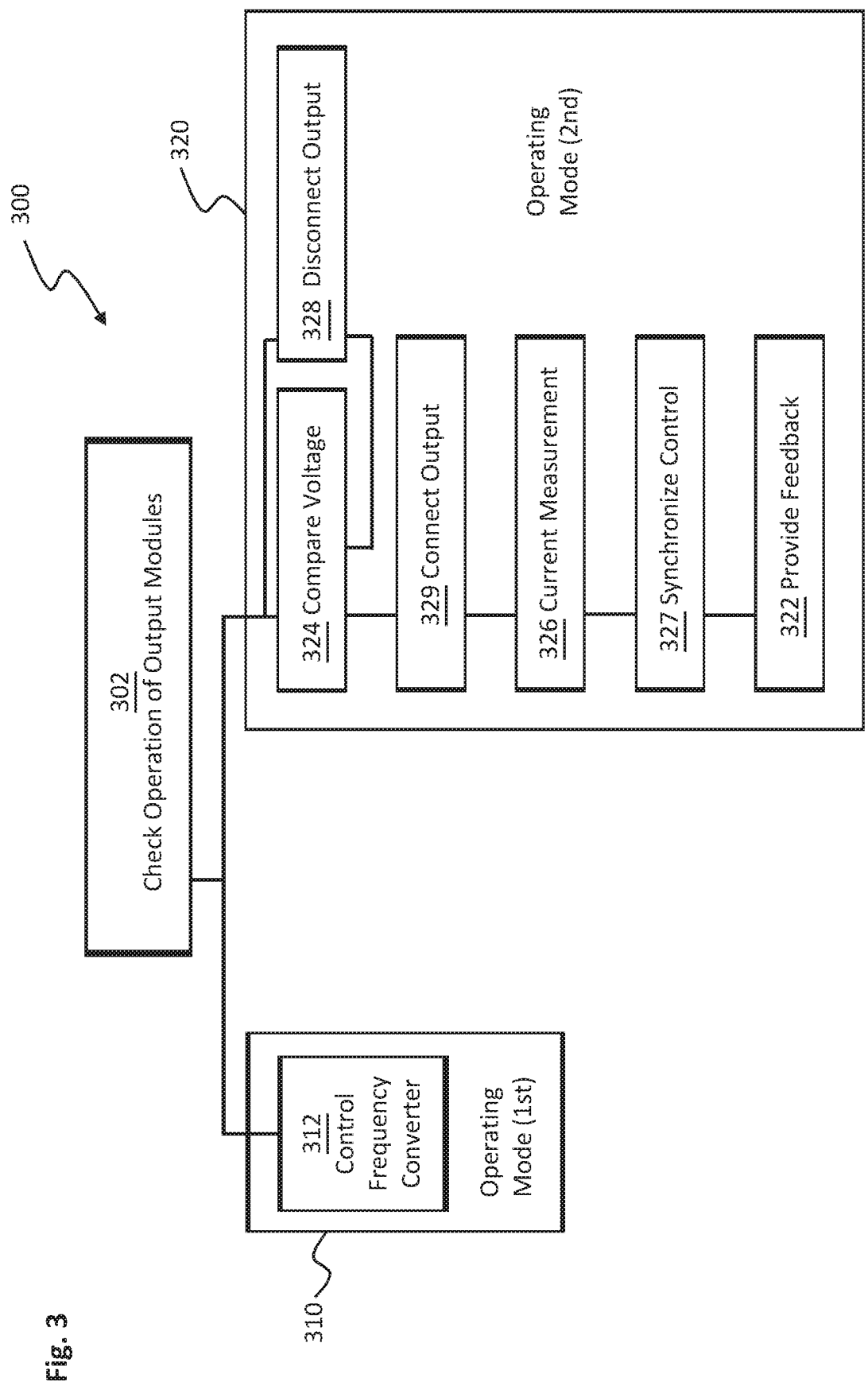
FIG. 3 shows a schematic flowchart of a method for operating a drive control system for an electrical drive.

FIG. 3 shows a schematic flowchart of a method 300 for operating the drive control systems 10, 202 for the electrical drives 1, 200.

As a first step, the method comprises checking 302 the operating mode of the output modules 100, 150, 210, 220. The operating mode can be checked 302, for example, during initialization of the output modules 100, 150, 210, 220, for example after the drive control systems 10, 202 have been switched on.

If a first operating mode 310 is determined when checking 302 the operating mode, like in the first or second further output modules 150, 220 described above for example, the frequency converter 108 is controlled 312 by the module controller 110 of the relevant output module 100, 150, 210, 220 during operation in such a manner that an electrical motor 2 connected to the output 102 of the relevant output module 100, 150, 210, 220 is supplied with a drive current from the DC voltage intermediate circuit 12. This control 312 is described in more detail in connection with FIGS. 1 and 2. Control of the frequency converter 108 in one manner may also comprise the electrical motor 2 being subjected to generator loading and the drive current flowing, as a negative output current, into the relevant output module 100, 150, 210, 220 and feeding electrical energy into the DC voltage intermediate circuit 12.

If a second operating mode 320 is determined, like in the first or second output modules 100, 210, the module controller 110 of the relevant output module 100, 150, 210, 220 controls 322 the frequency converters 108 in such a manner that an electrical feedback current from the DC voltage intermediate circuit 12 is fed back into the supply network 6 via the output 102. The control 322 for providing feedback is likewise explained in more detail in connection with FIGS. 1 and 2.

The drive control systems 10, 202 may be configured such that the intermediate circuit voltage may be variable in certain ranges during operation. For example, provision may be made for the intermediate circuit voltage to fluctuate between a minimum value and a maximum value. The minimum value and the maximum value may be 300 V and 1800 V, in particular 450 V and 900 V, for example. The maximum value may also constitute the upper cut-off voltage, above which electrical energy from the DC voltage intermediate circuit 12 is fed back into the supply network 6. However, the upper cut-off voltage may also be below the maximum value.

The control 322 for providing feedback can be carried out whenever the intermediate circuit voltage exceeds the upper cut-off voltage. For this purpose, if the second operating mode 320 has been determined, the method 300 may comprise comparing 324 the voltage of the DC voltage intermediate circuit 12 with the upper cut-off voltage. If the intermediate circuit voltage is less than the upper cut-off voltage, there is no feedback into the supply network 6. If the intermediate circuit voltage is greater than the upper cut-off voltage, the first or second output module 100, 210 begins to control 322 the frequency converter 108 to provide feedback.

The feedback can be terminated when the intermediate circuit voltage has fallen below the upper cut-off voltage again. For example, it is possible to terminate the feedback in the manner of two-point regulation as soon as the intermediate circuit voltage is lower than the upper cut-off voltage by a predefined differential voltage. The predefined differential voltage may be less than the difference between the maximum value and the minimum value of the intermediate circuit voltage or it may correspond to this difference.

The output modules 100, 150, 210, 220 may be configured such that, in the second operating mode 320, the control of the frequency converter 108 to provide feedback is synchronized with the AC voltage of the supply network 6 solely via the current measurement signal 122. After checking 302 the operating mode 310, 320 and comparing 324 the intermediate circuit voltage with the upper cut-off voltage, the method 300 may comprise, as further steps, producing 326 the current measurement signal 122. The method 300 may also comprise synchronizing 327 the control of the frequency converter 108 with the supply network 6 on the basis of the current measurement signal 122. This is described in more detail in connection with FIGS. 1 and 2.

In order to control the switching apparatus 24 and in order to avoid the supply network 6 being short-circuited via the frequency converter 108 in the event of a low intermediate circuit voltage, the method 300 may comprise, as a further step, disconnecting 328 the output 102 of the first or second output modules 100, 210 from the supply network 6 via the switching apparatus 24. The disconnection 328 can take place whenever the voltage of the DC voltage intermediate circuit 12 falls below the lower cut-off voltage.

The lower cut-off voltage may be such that the first or second output modules 100, 210 are connected to the supply network 6 via the switching apparatus 24 only when energy from the DC voltage intermediate circuit 12 is being fed back. Alternatively, the lower cut-off voltage may also be such that the first or second output modules 100, 210 are disconnected from the supply network 6 whenever there is the risk of the supply network 6 being short-circuited via the frequency converter 108 and the DC voltage intermediate circuit 12. For example, the lower cut-off voltage may correspond substantially to the voltage amplitude of the AC voltage of the supply network 6.

The method 300 comprises connecting 329 the output 102 of the first or second output modules 100, 210 to the supply network 6 before energy from the DC voltage intermediate circuit 12 is fed back into the supply network 6. Depending on the value of the lower cut-off voltage, this can be carried out either immediately before the feedback begins or already when the intermediate circuit voltage has increased above the voltage amplitude of the supply network 6 after the drive control systems 10, 202 have been switched on. In addition, in the method 300, the first or second output modules 100, 210 are disconnected 328 from the supply network 6 while the drive control system 10, 202 is being switched on and until the intermediate circuit voltage has completely built up to a value greater than the voltage amplitude of the supply network 6.

The first or second output modules 100, 210 which are operated as feedback modules in the second operating mode 320 make it possible to flexibly adapt the intermediate circuit voltage by means of regulated feedback. For example, it is possible to briefly increase the voltage in the DC voltage intermediate circuit 12 in order to retrieve a peak rotational speed of the motor 2 connected to the drive control systems 10, 202. It is also possible to stabilize the intermediate circuit voltage in a regulated manner using the output modules 100, 210.

The feedback via the frequency converter 108 of the first or second output modules 100, 210 can also be regulated in such a manner that a power factor correction is carried out for the drive control system 10, 202 connected to the supply network 6. This makes it possible, for example, to minimize the reactive power consumed by the drive control system 10, 202 and to adapt the type of load (inductive or capacitive) of the drive control system 10, 202.

EXEMPLARY EMBODIMENTS

1. Output module for connection to a DC voltage intermediate circuit of a drive control system for an electrical drive, having a frequency converter which is connected between the DC voltage intermediate circuit and an output of the output module, and having a module controller for controlling the frequency converter, the module controller being configured to control the frequency converter in a first operating mode of the output module in such a manner that an electrical motor is driven with an electrical drive current from the DC voltage intermediate circuit via the output, and the module controller being configured to control the frequency converter in a second operating mode of the output module in such a manner that an electrical feedback current from the DC voltage intermediate circuit is fed back into an electrical supply network via the output.

2. An output module according to embodiment 1, having a current measuring module which is configured to produce a current measurement signal representing the drive current or feedback current flowing via the output, the module controller having a current regulating module which is configured to regulate the drive current flowing via the output in the first operating mode and the feedback current flowing via the output in the second operating mode on the basis of the current measurement signal.

3. An output module according to any one of the preceding embodiments, the module controller being configured to synchronize the feedback current flowing via the output with the electrical supply network in the second operating mode on the basis of the current measurement signal.

4. An output module according to any one of the preceding embodiments, the module controller being configured to control a brake of the electrical drive in the first operating mode via a control output of the output module, and the module controller being configured to control a switching apparatus in the second operating mode via the control output in order to disconnect the output from the electrical supply network.

5. An output module according to any one of the preceding embodiments, the electrical supply network being a three-phase AC network.

6. An output module according to any one of the preceding embodiments, the module controller being configured to be changed to the first or second operating mode on the basis of a parameterization signal from a superordinate control unit of the drive.

7. An output module according to any one of the preceding embodiments, the module controller being configured to be changed to the first or second operating mode on the basis of a parameter received via a parameterization connection of the output module.

8. A drive control system for an electrical drive, having an output module according to any one of the preceding embodiments and a feed module, the feed module being configured to connect the DC voltage intermediate circuit of the drive control system to the supply network and to supply the DC voltage intermediate circuit with electrical energy from the supply network, the output module being configured to feed an electrical feedback current from the DC voltage intermediate circuit back into the supply network in the second operating mode.

9. A drive control system according to embodiment 8, having a smoothing apparatus which is connected between the output of the output module and the supply network in order to smooth the electrical feedback current fed back into the supply network via the output module in the second operating mode.

10. A drive control system according to any one of embodiments 8 to 9 having a switching apparatus which is connected between the output of the output module and the supply network in order to disconnect the output of the output module from the supply network.

11. A drive control system according to embodiment 10, the switching apparatus being connected to the control output of the output module in order to be controlled.

12. A drive control system according to any one of embodiments 8 to 11, the feed module being separate from the output module.

13. A drive control system according to any one of embodiments 8 to 12, having a further output module according to any one of embodiments 1 to 7, the further output module being configured to supply an electrical motor connected to the output of the further output module with a drive current from the DC voltage intermediate circuit of the drive control system in the first operating mode.

14. A network adapter module for an output module according to any one of embodiments 1 to 7, having a smoothing apparatus to be connected between the output of the output module and the supply network in order to smooth the electrical feedback current fed back into the supply network via the output module in the second operating mode, and having a network adapter control module which can be connected to a parameterization connection of the output module, the network adapter control module being configured to transmit a parameter characterizing the network adapter module to the output module.

15. A network adapter module according to embodiment 14, having a switching apparatus to be connected between the output of the output module and the supply network in order to disconnect the output of the output module from the supply network, the switching apparatus being able to be controlled via a control output of the output module.

16. A network adapter module according to any one of embodiments 14 to 15, the network adapter control module being configured to change the module controller to the second operating mode via the parameterization connection.

17. A method for operating an output module which can be connected to a DC voltage intermediate circuit of a drive control system for an electrical drive, the method comprising checking an operating mode of a module controller of the output module, the method also comprising if a first operating mode has been determined: controlling a frequency converter of the output module in order to drive an electrical motor with an electrical drive current from the DC voltage intermediate circuit via an output of the output module, and the method also comprising if a second operating mode has been determined: controlling the frequency converter of the output module in order to feed an electrical feedback current from the DC voltage intermediate circuit back into an electrical supply network via the output.

18. A method according to embodiment 17, the method comprising, as a further step in the second operating mode, comparing a voltage of the DC voltage intermediate circuit with an upper cut-off voltage, and the frequency converter being controlled to provide feedback if the voltage of the DC voltage intermediate circuit exceeds the upper cut-off voltage.

19. A method according to any one of embodiments 17 to 18, the method comprising, as further steps in the second operating mode: producing a current measurement signal representing an electrical current flowing via the output of the output module, and synchronizing a current regulating module of the output module, which controls the frequency converter, with the supply network on the basis of the current measurement signal.

20. A method according to any one of embodiments 17 to 19, the method comprising, as further steps in the second operating mode: disconnecting the output of the output module from the supply network by means of a switching apparatus connected to the output if the voltage of the DC voltage intermediate circuit falls below a lower cut-off voltage, and connecting the output of the output module to the supply network by means of the switching apparatus before the frequency converter is controlled to provide feedback.

While this invention has been described with respect to exemplary embodiments, it is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the appended claims.

The invention claimed is:

1. An output module for connection to a DC voltage intermediate circuit of a drive control system for an electrical drive,
    having a frequency converter which is connected between the DC voltage intermediate circuit and an output of the output module, the frequency converter being configured to convert a DC voltage of the DC voltage intermediate circuit into an AC voltage at the output of the output module, and
    having a module controller for controlling the frequency converter, the module controller comprising a current regulating module, a rotational speed regulating module and a feedback regulating module, the current regulating module being connected to the rotational speed regulating module and to the feedback regulating module, the rotational speed regulating module being configured to set an electrical drive current from the DC voltage intermediate circuit to an electrical motor, the feedback regulating module being configured to set an electrical feedback current from the DC voltage intermediate circuit to an electrical supply network, the module controller being configured to control the frequency converter in a first operating mode of the output module based on a value set by the rotational speed regulating module, in the first operating mode the electrical motor being connected to the output module, in such a manner that the electrical motor is driven with the electrical drive current from the DC voltage intermediate circuit via the output, and the module controller being configured to control the frequency converter in a second operating mode of the output module based on a value set by the feedback regulating module, in the second operating mode the electrical supply network being connected to the output module, in such a manner that the electrical feedback current from the DC voltage intermediate circuit is fed back into the electrical supply network via the output.

2. An output module according to claim 1, the module controller being configured to produce a desired current value for the drive current of the electrical motor and to control the frequency converter in such a manner that the electrical drive current corresponds to the desired current value for the drive current when being in the first operating mode, and the module controller being configured to produce a desired current value for the feedback current to be fed into the electrical supply network and to control the frequency converter in such a manner that the electrical feedback current corresponds to the desired current value for the feedback current when being in the second operating mode.

3. An output module according to claim 1, having a current measuring module which is configured to produce a current measurement signal representing the drive current or feedback current flowing via the output, the module controller having the current regulating module which is configured to regulate the drive current flowing via the output in the first operating mode and the feedback current flowing via the output in the second operating mode on the basis of the current measurement signal.

4. An output module according to claim 3, the module controller being configured to synchronize the feedback current flowing via the output with the electrical supply network in the second operating mode on the basis of the current measurement signal.

5. An output module according to claim 1, the module controller being configured to control a switching apparatus in the second operating mode via the control output in order to disconnect the output from the electrical supply network.

6. An output module according to claim 5, the module controller being configured to control a brake of the electrical drive in the first operating mode via the control output of the output module.

7. An output module according to claim 1, the electrical supply network being a three-phase AC network.

8. An output module according to claim 1, the module controller being configured to be changed to the first or second operating mode on the basis of a parameterization signal from a superordinate control unit of the drive.

9. An output module according to claim 1, the module controller being configured to be changed to the first or second operating mode on the basis of a parameter received via a parameterization connection of the output module.

10. A drive control system for an electrical drive, having an output module, a further output module and a feed module, the drive control system being an electrical supply network via the feed module, the output module, the further output module and the feed module being connected between a DC voltage intermediate circuit, the output module and the further output module each having a frequency converter which is connected between a DC voltage intermediate circuit and an output of the output module, the frequency converter being configured to convert a DC voltage of the DC voltage intermediate circuit into an AC voltage at the output of the output module, and the output module and the further output module each having a module controller for controlling the frequency converter, the module controller of the output module being configured to control the frequency converter in a first operating mode of the output module, in the first operating mode an electrical motor being connected to the output module, in such a manner that the electrical motor is driven with an electrical drive current from the DC voltage intermediate circuit via the output, and the module controller of the further output module being configured to control the frequency converter in a second operating mode of the further output module, in the second operating mode the electrical supply network being connected to the output module, in such a manner that an electrical feedback current from the DC voltage intermediate circuit is fed back into the electrical supply network via the output.

11. A drive control system according to claim 10, having a smoothing apparatus which is connected between the output of the further output module and the electrical supply network in order to smooth the electrical feedback current fed back into the supply network via the output module in the second operating mode.

12. A drive control system according to claim 10, having a switching apparatus which is connected between the output of the output module and the electrical supply network in order to disconnect the output of the further output module from the supply network.

13. A drive control system according to claim 12, the switching apparatus being connected to the control output of the further output module in order to be controlled.

14. A drive control system according to claim 10, the feed module being separate from the output module.

15. A drive control system according to claim 10, with a network adapter module for the further output module, having a smoothing apparatus to be connected between the output of the further output module and the electrical supply network in order to smooth the electrical feedback current fed back into the electrical supply network via the further output module in the second operating mode, and having a network adapter control module which can be connected to a parameterization connection of the further output module,
the network adapter control module being configured to transmit a parameter characterizing the network adapter module to the further output module.

16. A drive control system according to claim 15,
the network adapter module having a housing which is separate from the further output module.

17. A drive control system according to claim 15,
the network adapter module having a switching apparatus to be connected between the output of the further output module and the electrical supply network in order to disconnect the output of the further output module from the electrical supply network,
the switching apparatus being able to be controlled via a control output of the further output module.

18. A drive control system according to claim 15,
the network adapter control module being configured to change the module controller to the second operating mode via the parameterization connection.

19. A method for operating an output module which can be connected to a DC voltage intermediate circuit of a drive control system for an electrical drive, the output module having a frequency converter which can be connected between the DC voltage intermediate circuit and an output of the output module, the frequency converter being configured to convert a DC voltage of the DC voltage intermediate circuit into an AC voltage at the output of the output module,
the method comprising checking an operating mode of a module controller of the output module,
the method also comprising if a first operating mode, in the first operating mode an electrical motor being connected to the output module, has been determined:
controlling a frequency converter of the output module via a current regulating module based on a value set by a rotational speed regulating module in order to drive the electrical motor with an electrical drive current from the DC voltage intermediate circuit via an output of the output module, and
the method also comprising if a second operating mode, in the second operating mode an electrical supply network being connected to the output module, has been determined:
controlling the frequency converter of the output module via the current regulating module based on a value set by a feedback regulating module in order to feed an electrical feedback current from the DC voltage intermediate circuit back into an electrical supply network via the output.

20. A method according to claim 19,
the method comprising, as a further step in the second operating mode, comparing a voltage of the DC voltage intermediate circuit with an upper cut-off voltage, and
the frequency converter being controlled to provide feedback if the voltage of the DC voltage intermediate circuit exceeds the upper cut-off voltage.

21. A method according to claim 19,
the method comprising, as further steps in the second operating mode:
producing a current measurement signal representing an electrical current flowing via the output of the output module, and
synchronizing the current regulating module of the output module, which controls the frequency converter, with the supply network on the basis of the current measurement signal.

22. A method according to claim 19,
the method comprising, as further steps in the second operating mode:
disconnecting the output of the output module from the supply network by means of a switching apparatus connected to the output if the voltage of the DC voltage intermediate circuit falls below a lower cut-off voltage, and
connecting the output of the output module to the supply network by means of the switching apparatus before the frequency converter is controlled to provide feedback.

* * * * *